United States Patent
Kriss et al.

(10) Patent No.: US 7,512,542 B1
(45) Date of Patent: Mar. 31, 2009

(54) METHOD AND SYSTEM FOR MARKET RESEARCH DATA MINING

(75) Inventors: Mitchel Kriss, Long Grove, IL (US); Peter Cibulskis, Chicago, IL (US)

(73) Assignee: A.C. Nielsen (US), Inc., Schaumburg, IL (US)

( * ) Notice: Subject to any disclaimer, the term of this patent is extended or adjusted under 35 U.S.C. 154(b) by 0 days.

(21) Appl. No.: 09/329,487

(22) Filed: Jun. 10, 1999

(51) Int. Cl.
*G06F 17/00* (2006.01)

(52) U.S. Cl. .................. 705/7; 705/10; 705/14

(58) Field of Classification Search .......... 705/10, 705/14, 7
See application file for complete search history.

(56) References Cited

U.S. PATENT DOCUMENTS

| | | | | |
|---|---|---|---|---|
| 4,882,758 | A | * | 11/1989 | Uekawa et al. ............... 381/50 |
| 4,936,778 | A | * | 6/1990 | Stechell et al. ............. 434/107 |
| 5,420,786 | A | * | 5/1995 | Felthauser et al. .......... 364/401 |
| 5,854,746 | A | * | 12/1998 | Yamamoto et al. ....... 364/468.13 |
| 6,009,407 | A | * | 12/1999 | Garg ........................... 705/10 |
| 6,029,139 | A | * | 2/2000 | Cunningham et al. ......... 705/10 |
| 6,032,125 | A | * | 2/2000 | Ando .......................... 705/10 |
| 6,044,357 | A | * | 3/2000 | Garg ........................... 705/10 |

FOREIGN PATENT DOCUMENTS

| | | | |
|---|---|---|---|
| JP | 8-16950 | * | 2/1996 |
| WO | WO 0171620 | * | 9/2001 |

OTHER PUBLICATIONS

Klapper et al., "Forecasting Market Share Using Predicted Values of Competitive Behavior," International Journal of Forecasting, Jul.-Sep. 2000, v16n3, abstract.*
Kemery et al., "Partialling Factor Scores Does Not Control Method Variance," Journal of Management, Winter 1986, v12, n4, abstract.*
Brodie et al., "Conditions when market share models are useful for forecasting," International Journal of Forecasting, Sep. 1994, v10, n2, abstract.*
Geurts et al., "Forecasting MArket Share," Journal of Business Forecasting, WInter 1992-1993, v11, n4, 6 pages.*
Pindyck et al., Econometric Models and Economic Forecasts, McGraw Hill, 1991, pp. 101-104; 180-190.*
Besser, "Community involvement and the perception of success among small business operators in small towns," Journal of Small Business Management, v37, n7, Oct. 1999, 12 pages.*

(Continued)

*Primary Examiner*—Marc E Norman
(74) *Attorney, Agent, or Firm*—Hanley, Flight & Zimmerman, LLC (57) ABSTRACT

Purchases made by customers of a supplier of interest from other suppliers are estimated based upon panelist data regarding purchases made by panelists from the supplier of interest and from the other suppliers, and based upon customer data regarding purchases made by the customers from the supplier of interest. The panelists are a subset of the customers. A linear relationship between the purchases made by the panelists from the supplier of interest and the purchases made by the panelists from the other suppliers is determined. Based upon the customer data and the linear relationship, the purchases made by the customers from the other suppliers are estimated.

46 Claims, 3 Drawing Sheets

OTHER PUBLICATIONS

Wisconsin Innovation Service Center (WISC) web site, downloaded Aug. 6, 2002, disclosure agreement copyright 1980, revision date Feb. 1997, 16 pages.*
"Wisconsin Center helps companies do product and market research," Manufacturing News, v3, n20, Nov. 1, 1996, 1 page.*
Hallowell, "The relationships of customer satisfaction, customer loyalty, and profitability: an empirical study," International Journal of Service Industry Management, v7, n4, 1996, 11 pages.*
Mallay, "A practical guide to competitor intelligence," The Business of Shareware, 1996, 18 pages.*
Biong, "Satisfaction and loyalty to suppliers in the grocery trade," European Journal of Marketing, v27, n7, 1993, 14 pages.*
Joussef et al., "Supplier selection in an advanced manufacturing technology environment: an optimization model," Benchmarking for Quality Management and Technology, v3, n4, 1996, 9 pages.*
Sirohi et al., "A model of consumer perceptions and store loyalty intentions for a supermarket retailer," Journal of Retailing, v74 n2, Summer 1998, 15 pages.*
Goodwin et al., "Closing the loop on loyalty," Marketing Management, v8, n1, Spring 1999, 12 pages.*
Appiah-Adu, "Marketing effectiveness and customer retention in the service sector," Service Industries Journal, v19, n3, Jul. 1999, 11 pages.*
Malhotra, "Competitive Intelligence Programs: An Overview," Brint Institute, 1996, 6 pages.*
Attaway, "A review of issues related to gathering and assessing competitive intelligence," American Business Review, v16, n1, Jan. 1998, 12 pages.*
Luecal et al., "Gathering competitive intelligence," Management Quarterly, v36, n3, Fall 1995, 10 pages.*
Anonymous, "Turning knowledge into action," Chain Store Age, Jan. 1996, 5 pages.*
Bloom et al., "The proactive professional," Marketing Management, v2, n1, 1993, 12 pages.*
Duncan et al., "Customer valuation as a foundation for growth," Managing Service Quality, 1997, v7, n1, 7 pages.*
Ezop, Phyllis, "Database marketing research," Marketing Research, Fall 1994, v6, n4, 8 pages.*
Egol, Len, "Boot up the perfect salesperson; computerized expert systems help generate personalized communications," Direc Oct. 1993, v5, n10, 1 page.*
"Cross-Outlet Shopping Analysis Completes the Sales Story," ACNielsen: Consumer Insight Magazine, from website www.acnielsen.com/pubs/ci/1999/q4/products/cps.htm, 2 pages.*
Cassano, Joseph, "Fresh Information," Mar. 1998, Food and Bverage Marketing, v17, n3, 4 pages.*
Parks, Liz, "The 'wheres and whys' behind home and personal care purchases," Jan. 12, 1998 Drug Store News, v20, n1, 7 pages.*
Mitchell et al., "Primary and secondary store-loyal customer perceptions of grocery retailers," 1998, British Food Journal, v100, n7, 9 pages.*
Abe et al., "Store Sales and Panel Purchase Data: Are They Compatible?" Oct. 1995, 28 pages.*
Olin, Dirk, "Culture Watch/ GOP Congress Members Take Leave of Sensus," Newsday, Nov. 16, 1997, 2 pages.*
Petzold, C., "Turning Data into Information," PC Magazine, v. 4, n. 23, Nov. 12, 1985, 4 pages.*
Unruh, James A., "Keeping the Customer Satisfied," InformationWeek, n. 591, Aug. 5, 1996, 6 pages.*
Klepacki, Laura, "Stores urged to use consumer panel," Supermarket News, May 9, 1994, v44, n19, 2 pages.*
Internet Archive (WayBackMachine), internet archive search for www.ACNielsen.com, archive date: Apr. 18, 1998, 4 pages.*

* cited by examiner

METHOD AND SYSTEM FOR MARKET RESEARCH DATA MINING

TECHNICAL FIELD OF THE INVENTION

The present invention is directed to a method and system for mining data, such as market research data.

BACKGROUND OF THE INVENTION

Data are collected and stored in a database or a data warehouse for a variety of reasons. For example, it is known to collect market research data from a panel of product purchasers so that conclusions about the buying habits of specific population segments may be made. One such panel is operated by the A.C. Nielsen Company. The members of this panel store, in memory, data about the products which they purchase, and forward that data periodically to a central facility. For this purpose, these panelists are generally provided with UPC scanners which they use to scan and store the UPCs attached to the products that they purchase. The scanners are inserted into corresponding docking stations which serve to charge the scanners when the scanners are not in use, and to transmit the UPC information stored in the scanners to the central facility. At the central facility, the data from all panelists are accumulated and correlated in order to generate appropriate reports.

It is also known for a product supplier, such as a retailer, to collect data regarding its product sales so that the product supplier can determine the effectiveness of marketing programs, advertising, promotions, shelf or rack space allocations, product displays, and/or the like. For a retailer, this type of data is generally collected at the point-of-sale terminals where the sales to its customers are processed.

The product supplier might also want to correlate its product sales information with demographic information about its customers so that the product supplier can form conclusions regarding the types of people purchasing its products. For this purpose, it is known for a product supplier to issue customer identification cards which are used by its customers to identify themselves at the time that they make their purchases. Accordingly, the product supplier can correlate demographic information about its customers with its products sales.

None of the arrangements described above, however, provide the product supplier with information about purchases its customers make from other product suppliers, such as competitive product suppliers. This type of information would also be useful to the product supplier who could then, for example, benchmark the effectiveness of its marketing strategies against those of its competitors.

Therefore, the present invention is directed to a system and method for estimating the purchases which the customers of a product supplier or other marketing entity make from other product suppliers or marketing entities.

SUMMARY OF THE INVENTION

According to one aspect of the present invention, a method is provided to estimate purchases made by customers of a supplier of interest from other suppliers. The method is performed on a computer and comprises the following steps: a) reading panelist data regarding purchases made by panelists from the supplier of interest and from the other suppliers, wherein the panelists are a subset of the customers; b) determining a relationship between the purchases made by the panelists from the supplier of interest and the purchases made by the panelists from the other suppliers; c) reading customer data regarding purchases made by the customers from the supplier of interest; and, d) based upon the customer data and the relationship, estimating the purchases made by the customers from the other suppliers.

According to another aspect of the present invention, a method is provided to estimate purchases made by customers of a supplier of interest from other suppliers. The method is performed on a computer and comprises the following steps: a) reading customer data regarding purchases made by the customers from the supplier of interest; b) reading panelist data regarding purchases made by panelists from the supplier of interest and from the other suppliers, wherein the panelists are a subset of the customers; and, c) based upon the customer data and the panelist data, estimating purchases made by the customers from the other suppliers.

According to still another aspect of the present invention, a method is provided to estimate purchases made by customers of a supplier of interest. The method is performed on a computer and comprises the following steps: a) determining a linear relationship between purchases made by panelists from the supplier of interest and purchases made by the panelists from other suppliers; and, b) estimating purchases by the customers from the other suppliers based upon the linear relationship.

According to yet another aspect of the present invention, a system for estimating purchases made by customers of a supplier of interest comprises analyzing means and estimating means. The analyzing means analyzes purchases made by the customers from the supplier of interest and purchases made by panelists from both the supplier of interest and other suppliers. The panelists are a subset of the customers of the supplier of interest. The estimating means estimates purchases by the customers from the other suppliers based upon the analyzed purchases.

BRIEF DESCRIPTION OF THE DRAWINGS

These and other features and advantages of the present invention will become more apparent from a detailed consideration of the invention when taken in conjunction with the drawings in which.

DETAILED DESCRIPTION

According to the present invention, estimating the purchases made by the customers of a product supplier of interest from other product suppliers is preferably based upon two sources of data. A first source of data provides panelist data. This panelist data is collected from a panel which is formed from the customer base of the product supplier of interest. The panelist data collected from these panelists includes not only data on the purchases that the panelists make from the product supplier of interest, but also data on the purchases that the panelists make from the other product suppliers. Accordingly, the panelist data may be characterized as multichannel data. Also collected from each panelist is a panelist ID uniquely identifying the corresponding panelist.

A second source of data is the product supplier of interest, who supplies data regarding its sales to its customers. This data is referred to hereinafter as customer data and may be collected by the product supplier of interest from its customers using a variety of methods. However, a product supplier typically has a preferred customer program in which the product supplier supplies its preferred customers with identification cards that can be scanned. The product supplier then collects purchase data from each preferred customer in the usual way and also scans the preferred customer's unique identification from the preferred customer's identification card. The purchase data and the identification data are stored together so that the purchase data are associated with the corresponding preferred customers. Thus, the data from the second source is the customer data accumulated from the preferred customers of the product supplier of interest and is limited to purchases made from the product supplier of interest. Accordingly, the customer data may be characterized as unichannel data.

Based upon the panelist data and the customer data, purchases from other product suppliers made by the preferred customers of the product supplier of interest can be estimated in accordance with the present invention.

Figure 1:
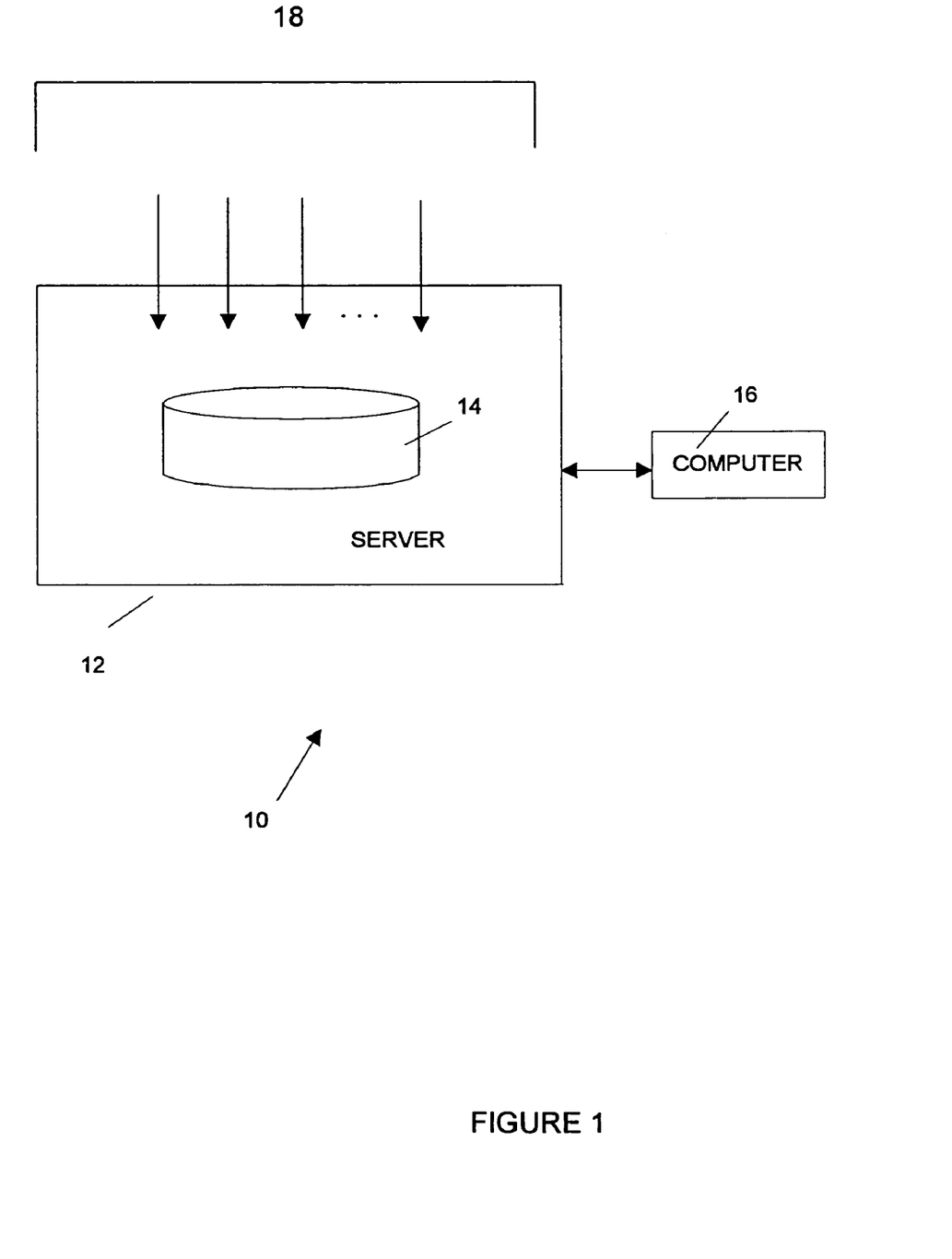
FIG. 1 is an exemplary computing system which may be used to carry out the present invention; and, FIGS. 2A and 2B illustrate a flow chart showing a program that may be executed by the computing system of FIG. 1 according to the present invention.
Figure 2A:
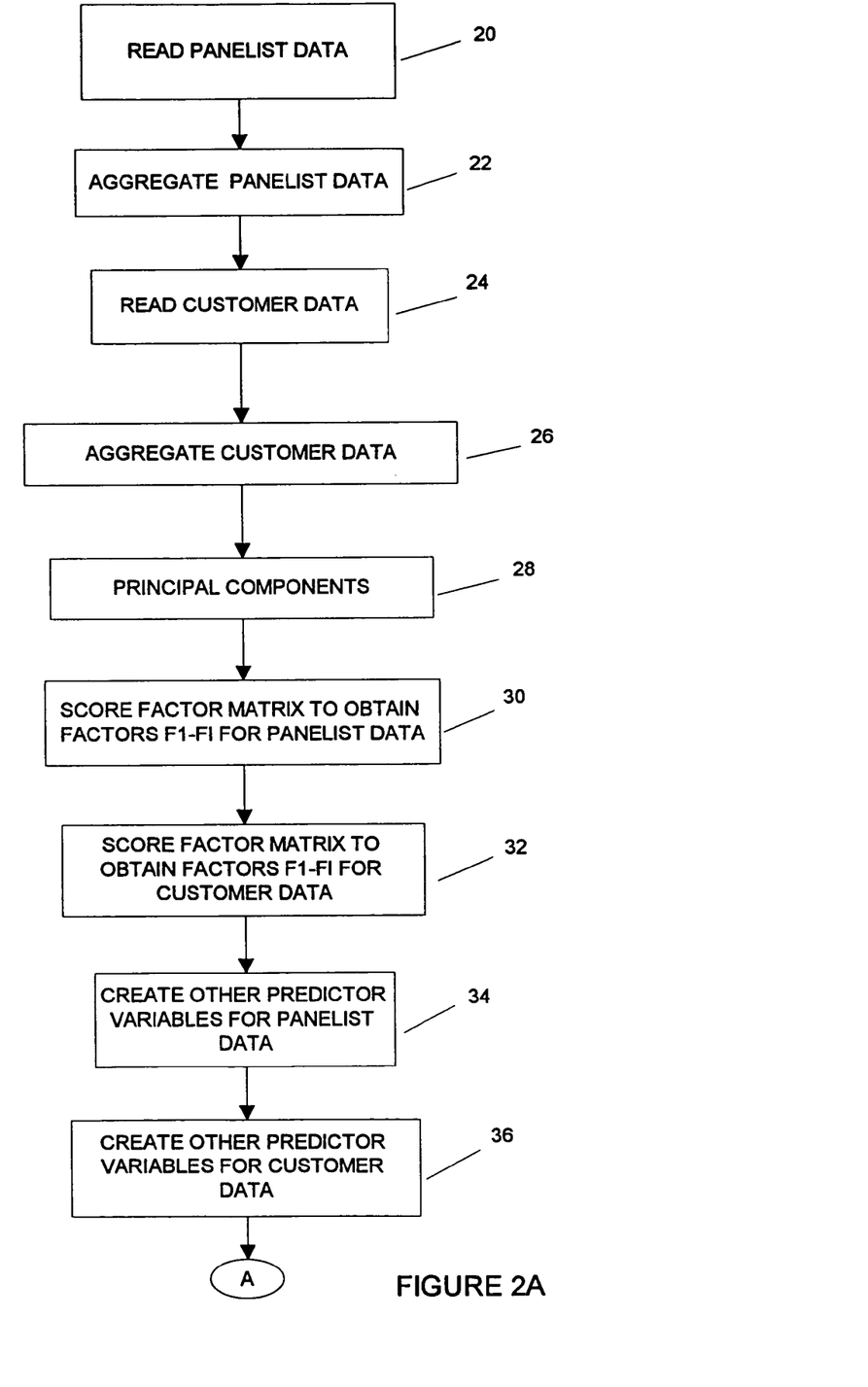
Figure 2B:
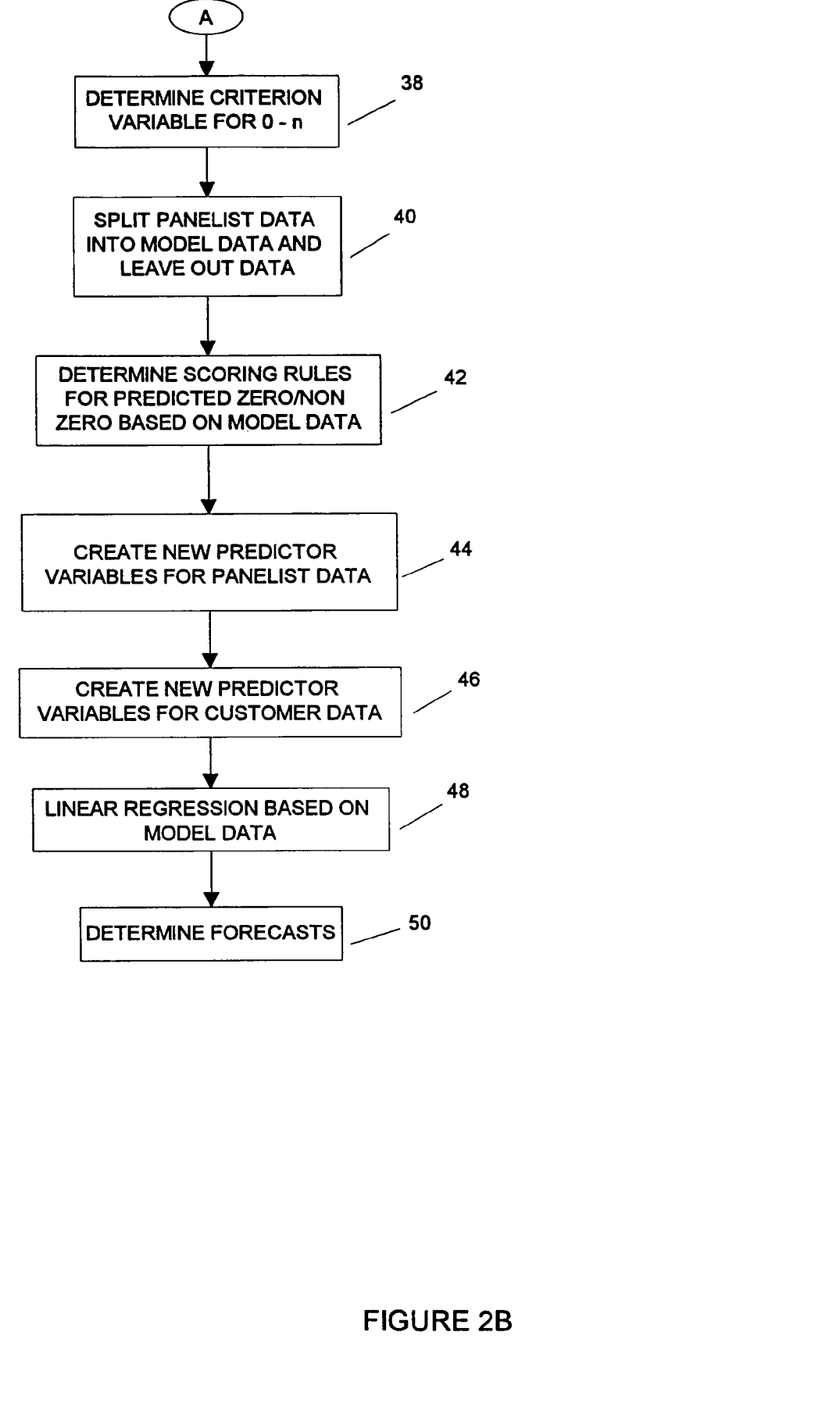

This estimate may be made with the aid of a computing system 10 as shown in FIG. 1 programmed in accordance with the flow chart shown in FIGS. 2A and 2B. The computing system 10 includes a data server 12 which stores a data warehouse 14 in its memory. The data warehouse 14, for example, may be a relational database. An access computer 16 is used for writing data into the data warehouse 14 and for reading data out of the data warehouse 14. The access computer 16 may be one or more personal computers and/or workstations. The access computer 16 may be provided with a display in order to present the user of the computing system 10 with various screen displays formatted for ease of data entry, data manipulation, and report generation. The access computer 16 may further have a keyboard, a bar code scanner for scanning codes such as uniform product codes or other industry codes, an optical character recognition device, and/or other data input devices.

Data may be supplied to the data warehouse 14 from a variety of sources 18 which include the first and second sources described above. As described below, data may be arranged in the form of tables such that each table stores a group of similar data. However, it should be understood that, although tables may be referenced herein, the data may be organized in any desired form so that the term "table" as used herein is a generic term.

In order to make the estimate described above, the panelist data are read from the data warehouse 14 at a block 20 of FIGS. 2A and 2B. The panelist data are aggregated at a block 22 by panelist ID. For each panelist ID, the data is further aggregated by product category. The product categories are selected based on the products offered by the product supplier of interest. For example, if the product supplier of interest is a grocery store chain, one product category might be carbonated beverages and another might be breakfast cereals. Thus, the panelist data are aggregated within each panelist ID table by product category.

Within each product category, the panelist data is further divided between purchases that the corresponding panelist made from the product supplier of interest and purchases that the corresponding panelist made from the other product suppliers. The panelist data are also stored in the product categories by trip. Accordingly, if a panelist purchased a product in a product category from one product supplier during one trip and a product in the same product category from the same product supplier during another trip, the panelist's data would contain an entry in the same product category for each trip. Therefore, each panelist ID table includes the number of dollars that the corresponding panelist spent in each product category by trip to the product supplier of interest, and the number of dollars that the corresponding panelist spent in each product category by trip to the other product suppliers.

Moreover, the panelist data may be aggregated at the block 22 so that the number of dollars spent with the product supplier of interest is totaled by panelist ID across all product categories and is included in the table for the corresponding panelist, and so that the number of trips made by each panelist to the product supplier of interest is totaled across all product categories and is included in the table for the corresponding panelist. Similarly, the data may be aggregated at the block 22 so that the number of dollars spent with the other product suppliers by each panelist is totaled across all product categories and is included in the table for the corresponding panelist, and so that the number of trips made by each panelist to the other product suppliers is totaled across all product categories and is included in the table for the corresponding panelist.

Furthermore, each panelist ID table further includes a product supplier of interest share for each product category. In determining this share, the dollars paid by the panelist to the product supplier of interest in the corresponding product category during all trips covered by the applicable time period are divided by the total dollars paid by the panelist to the product supplier of interest in all product categories during the same time period. Each panelist ID table includes the dollars paid by the panelist to other product suppliers for each product category during all trips covered by the applicable time period.

Finally, the panelist data in each panelist ID table are also similarly aggregated for each department. That is, the panelist data are aggregated in the same way as discussed above but this time by department, where each department covers one or more related product categories. Thus, the panelist data within a department are aggregated according to trips, dollars, share, etc. for the product supplier of interest and for the other product suppliers.

It should be understood from the foregoing description that the panelist data stored in the panelist ID tables are segregated between product supplier of interest and other product suppliers.

At a block 24, the customer data (from the product supplier of interest, i.e., the second source) are read from the data warehouse 14. At a block 26, the customer data are aggregated by customer ID in the same manner as described above in connection with the block 22.

At a block 28, an unrotated principal components factor analysis is performed on the data aggregated at the block 26 (i.e., the aggregated customer data). Thus, except for inconsistent customer data, the inputs to the unrotated principal components factor analysis are all records stored in the customer ID tables, where each record contains the purchases at the UPC level that the corresponding customer made in a specific store at a specific date and time. If a customer does not spend money in any product category in at least two trips out of the most recent sixteen week period, then the data for that customer is considered to be inconsistent customer data. Also, if a customer does not spend at least a predetermined amount of money (such as $75.00) in ant product category during a predetermined amount of time (such as a year), the data for that customer is considered to be inconsistent customer data. Furthermore, if customer data is collected for a product that does not fit into a defined product category, such customer data is considered to be inconsistent customer data. Thus, inconsistent customer data is not used by the block 28.

The unrotated principal components factor analysis is a well-known statistical analytical tool for analyzing input data. This analysis produces a factor matrix which is a k×i matrix having k rows and i columns, where k is the number of customer IDs, and where i is the number of factors resulting from the unrotated principal components factor analysis. The unrotated principal components factor analysis collapses the j dimensions in product category space (where j is the number of product categories) down to i dimensions. The value of i may be selected so that each of the i dimensions has a minimum eigenvalue (such as 1.3).

At a block 30, the factor matrix generated at the block 28 is used to score the panelist data. This scoring is accomplished by matrix multiplying the factor matrix produced at the block 28 and the k×j panelist data to produce k×i factors. Accordingly, this matrix multiplication generates a panelist set of factors $F_1$ through $F_i$ for each panelist ID, where i<j. Thus, a principal component category may be identical to a product category if the sales in the product category are sufficiently high. The factors $F_1$ through $F_i$ of the panelist set of factors are part of the panelist predictor variables discussed below.

Similarly, at a block 32, the factor matrix generated at the block 28 is also used to score the customer data. Again, this scoring is accomplished by matrix multiplying the factor matrix produced at the block 28 and the k×j customer data to produce k×i factors. This matrix multiplication, therefore, generates a customer set of factors $F_1$ through $F_i$ for each customer ID. The factors $F_1$ through $F_i$ of the customer set of factors are part of the customer predictor variables discussed below.

For each panelist, other panelist predictor variables are created at a block 34. These other panelist variables are determined from the panelist data and include one or more of the following: $F_1^2$ through $F_i^2$ which are the squares of the corresponding factors $F_1$ through $F_i$ created at the block 30; interdependent factors which include the products of all possible pairs of the factors $F_1$ through $F_i$ created at the block 30 (that is, $F_1 \times F_2, F_1 \times F_2, \ldots F_1 \times F_i, F_2 \times F_3, F_2 \times F_4, \ldots F_2 \times F_1, F_3 \times F_4, \ldots F_{i-1} \times F_i$); $T_1, T_2, \ldots, T_j$ which are the total number of panelist trips in the corresponding j product categories; $T_1^2, T_2^2, \ldots, T_j^2$ which are the squares of $T_1, T_2, \ldots, T_j$; TD which is the sum of the dollars spent by the corresponding panelist in all product categories; $TD^2$ which is the square of TD; $CD_1, CD_2, \ldots, CD_j$ which are the dollars spent by the corresponding panelist with the product supplier of interest in the corresponding j product categories; and, $CO_1, CO_2, \ldots CO_j$ which are the dollars spent with the other product suppliers in the corresponding j product categories.

Similarly, for each customer ID, other customer predictor variables are created at a block 36 for each product category. These customer predictor variables are determined from the customer data and include one or more of the following: $F_1^2$ through $F_i^2$ which are the squares of the corresponding factors $F_1$ through $F_i$ created at the block 32; interdependent factors which include the products of all possible pairs of the factors $F_1$ through $F_i$ created at the block 32 (that is, $F_1 \times F_2, F_1 \times F_2, \ldots F_1 \times F_i, F_2 \times F_3, F_2 \times F_4, \ldots F_2 \times F_i, F_3 \times F_4, \ldots F_{i-1} \times F_i$); $T_1, T_2, \ldots, T_j$ which are the total number of customer trips in the corresponding j product categories; $T_1^2, T_2^2, \ldots, T_j^2$ which are the squares of $T_1, T_2, \ldots, T_j$; TD which is the sum of the dollars spent by the corresponding customer in all product categories; $TD^2$ which is the square of TD; and, $CD_1, CD_2, \ldots, CD_j$ which are the dollars spent by the corresponding customer with the product supplier of interest in the corresponding j product categories. $CO_1, CO_2, \ldots, CO_j$, which are the dollars spent by the corresponding customer with the other product suppliers in the corresponding product categories, is to be estimated.

A set of criterion variables $CV_i$ is created at a block 38 for each product category by dividing the panelist IDs into buckets according to their values of $CO_j$. That is, for a first product category, a bucket zero contains all panelist IDs whose corresponding value of $CO_j=0$, provided that there are at least a predetermined number (such as 150) of such panelist IDs. The remaining panelist IDs are sorted from highest to lowest according to their values of $CO_1$ and are then divided evenly into buckets one through n for the first product category, with the bucket one containing the remaining panelist IDs whose values of $CO_1$ are lowest (other than zero), with the bucket two containing the remaining panelist IDs whose values of $CO_1$ are next lowest, and so on.

Each of the buckets one through n must contain at least the predetermined number of panelist IDs, and each of the buckets one through n must come as close as possible to containing the predetermined number of panelist IDs with the proviso that all of the buckets one through n should contain, as closely as possible, an equal number of panelist IDs.

If the bucket zero is only a few panelist IDs short of the predetermined number, a sufficient number of remaining panelist IDs whose values of $CO_1$ are lowest may be moved into the bucket zero so that the bucket zero contains the predetermined number of panelist IDs. This movement is made before the sorting and dividing described above. On the other hand, if the bucket zero contains only a few panelist IDs, no panelist IDs are put into the bucket zero and instead all panelist IDs are sorted and divided as described above. The criteria used to make these decisions may be established as desired.

The criterion variable $CV_0$ for the first product category is set equal to the number of panelist IDs in the bucket zero, the criterion variable $CV_1$ for the first product category is set equal to the number of panelist IDs in the bucket one, the criterion variable $CV_2$ for the first product category is set equal to the number of panelist IDs in the bucket two, and so on.

This process is then repeated for each of the other product categories so that there is a set of criterion variables for each of the product categories.

At a block 40, the panelist data are split between model data and leave out data. All panelist data associated with a randomly selected r % of the panelist IDs are designated as leave out data. The value of r, for example, may be 15, so that all panelist data associated with 15% of the panelist IDs selected at random are designated as leave out data. The remaining panelist data is designated as model data.

At a block 42, scoring rules are determined from the model data. For example, a commercially available software program entitled "Wizwhy" supplied by WizSoft can be used at the block 42 in order to determine these scoring rules. These scoring rules are if-then scoring rules and are subsequently used in creating new panelist and customer predictor variables as described below. Wizwhy actually creates two kinds of if-then scoring rules, i.e., "is if-then" scoring rules and "is not if-then" scoring rules. An "is if-then" scoring rule, for example, has the following format: if dollars are greater than 100, then the output is true (1), otherwise the output is false (0). Similarly, an "is not if-then" scoring rule, for example, has the following format: if dollars are less than 50, then the output is false (0), otherwise the output is true (1). The inputs to the Wizwhy program during this iteration are the predictor variables which meet all of the following three criteria: (i) the predictor variables must correspond to the model data; (ii) the predictor variables must correspond to the panelist IDs in the bucket zero; and, (iii) the predictor variables must correspond to the first product category. However, the predictor variables used at the block 42 exclude the square terms and the interdependent factors.

Next, the Wizwhy program determines similar scoring rules based on the panelist IDs in the bucket one. That is, the inputs to the Wizwhy program during this iteration are the predictor variables which meet all of the following three criteria: (i) the predictor variables must correspond to the model data; (ii) the predictor variables must correspond to the panelist IDs in the bucket one; and, (iii) the predictor variables must correspond to the first product category. However, the predictor variables used at the block 42 again exclude the square terms and the interdependent factors. An iteration of the Wizwhy program is similarly executed for each of the other buckets. This process is then repeated for each of the other product categories.

At a block 44, new panelist predictor variables are created based upon both the model data and the leave out data. The creation of these new panelist predictor variables is effected by using first the "is if-then" scoring rules and then the "is not if-then" scoring rules generated at the block 42 in order to score the model data and the leave out data by bucket and by product category. That is, the model data and the leave out data which are in a first of the product categories and which relate to the panelist IDs in the bucket zero are first supplied to the "is if-then" scoring rules and the outputs (0's and 1's) are summed. This sum is a first new panelist predictor variable relating to data which are in the first product category and which correspond to the panelist IDs in the bucket zero.

Next, the model data and the leave out data which are in this first product category and which correspond to the panelist IDs in the bucket one are supplied to the "is if-then" scoring rules and the outputs (0's and 1's) are summed. This sum is a first new panelist predictor variable relating to data which are in the first product category and which correspond to the panelist IDs in the bucket one. This process, using the "is if-then" scoring rules, is repeated so that there is a first new panelist predictor variable for the first product category relating to each bucket.

Then, the model data and the leave out data which are in the first product category and which relate to the panelist IDs in the bucket zero are supplied to the "is not if-then" scoring rules and the outputs (0's and 1's) are summed. This sum is a second new panelist predictor variable relating to data which are in the first product category and which correspond to the panelist IDs in the bucket zero.

Next, the model data and the leave out data which are in this first product category and which correspond to the panelist IDs in the bucket one are supplied to the "is not if-then" scoring rules and the outputs (0's and 1's) are summed. This sum is a second new panelist predictor variable relating to data which are in the first product category and which correspond to the panelist IDs in the bucket one. This process, using the "is not if-then" scoring rules, is repeated so that there is a second new panelist predictor variable for the first product category relating to each bucket.

Then, the model data and the leave out data which are in a second of the product categories and which relate to the panelist IDs in the bucket zero are supplied to the "is if-then" scoring rules and the outputs (0's and 1's) are summed. This sum is a first new panelist predictor variable relating to data which are in the second product category and which correspond to the panelist IDs in the bucket zero.

Next, the model data and the leave out data which in this second product category and which correspond to the panelist IDs in the bucket one are supplied to the "is if-then" scoring rules and the outputs (0's and 1's) are summed. This sum is a first new panelist predictor variable relating to data which are in the second product category and which correspond to the panelist IDs in the bucket one.

This process, using the "is if-then" scoring rules, is repeated so that there is a first new panelist predictor variable for the second product category relating to each bucket.

Then, the model data and the leave out data which are in the second product category and which relate to the panelist IDs in the bucket zero are first supplied to the "is not if-then" scoring rules and the outputs (0's and 1's) are summed. This sum is a second new panelist predictor variable relating to data which are in the second product category and which correspond to the panelist IDs in the bucket zero.

Next, the model data and the leave out data which in this second product category and which correspond to the panelist IDs in the bucket one are supplied to the "is not if-then" scoring rules and the outputs (0's and 1's) are summed. This sum is a second new panelist predictor variable relating to data which are in the second product category and which correspond to the panelist IDs in the bucket one. This process, using the "is not if-then" scoring rules, is repeated so that there is a second new panelist predictor variable for the second product category relating to each bucket.

This process is repeated for each of the other product categories.

At a block 46, new customer predictor variables are created based upon the customer data in a similar manner. However, in this case, there are no buckets. Thus, the creation of two new customer predictor variables per product category is effected by using first the "is if-then" scoring rules and then the "is not if-then" scoring rules generated at the block 42 in order to score the customer data for each corresponding product category. That is, the customer data in the first product category are first supplied to the "is if-then" scoring rules and the outputs (0's and 1's) are summed. This sum is the first new customer predictor variable for the customer data relative to the first product category. Then, the customer data in the first product category are supplied to the "is not if-then" scoring rules and the outputs (0's and 1's) are summed.

This sum is the second new customer predictor variable for the customer data relative to the first product category. This process is repeated for each of the other product categories so that there are two new customer predictor variables based on customer data for each product category.

At a block 48, the subroutine Proc Reg of the commercially available program SAS is performed. The Proc Reg subroutine is a linear regression that is performed based only on the model data and that generates an output coefficient matrix. Each row of this matrix contains a set of coefficients for a corresponding product category. The Proc Reg subroutine is performed J times, where J is 50 for example, according to the following equation:

$$\text{model } depvar=indepvar/\text{maxr stop}=i \qquad (1)$$

where the dependent variable depvar are the criterion variables by product category as determined at the block 38, and where the independent variables indepvar are the predictor variables created at the blocks 44 by product category. The Proc Reg subroutine is shown in the attached Appendix. The output coefficient matrix of the Proc Reg subroutine as executed by the block 48 is a linear equation for each product category, where each linear equation has a set of coefficients as contained in a corresponding row of the output coefficient matrix. These linear equations are used by the block 50 as discussed below. These linear equations establish a linear relationship by product category between purchases made by panelists from the supplier of interest and purchases made by the panelists from the other suppliers.

The block 50 uses the new customer predictor variables determined at the block 46 as inputs for the variables in the linear equations determined at the block 48 in order to estimate (i.e., forecast) sales to the preferred customers by the other product suppliers in each of the product categories. Accordingly, the new predictor variables, which are created at the block 46 from the customer data and which relate to the purchases made by the customers from the supplier of interest in each product category, are substituted for the variables in the corresponding linear equation, which relates the purchases made by the panelists from the supplier of interest to the purchases made by the panelists from the other suppliers, in order to forecast the purchases that the customers made from the other suppliers.

As used herein, a product supplier, for example, may be a retailer, a wholesaler, a manufacturer, or other product supplier. Also, although the present invention has been described in detail in terms of products for ease of understanding, it should be understood that the present invention applies equally well to services. Therefore, the present invention should be understood to apply to products and/or services.

Certain modifications of the present invention have been discussed above. Other modifications will occur to those practicing in the art of the present invention. For example, as described above, the present invention is implemented by a program represented by the flow chart shown in FIGS. 2A and 2B. Instead, the present invention may be implemented by way of a neural network arranged in accordance with the processing represented by FIGS. 2A and 2B.

Also, as described above, customer data may be collected from the preferred customers of the product supplier of interest. However, it should be understood that the customer data may be collected from more, fewer, and/or different customers of the product supplier of interest. Therefore, the term "preferred customer" is used generically herein.

Moreover, certain predictor variables as described above are created at the blocks 30-36. However, fewer and/or different predictor variables may instead be created.

Furthermore, as described above, if a customer does not spend money in any product category in at least two trips out of the most recent sixteen week period, then the data for that customer is considered to be inconsistent customer data. However, the number of trips may be other than two, and/or the time period may be other than a sixteen week period.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of estimating purchases made by customers of a supplier of interest from other suppliers, wherein the method is performed on a computer, and wherein the method comprises:
    reading panelist data regarding purchases made by panelists from the supplier of interest and purchases made by the panelists from the other suppliers, wherein the panelists are a subset of the customers, and wherein the purchases made by the panelists from the supplier of interest are independent of the purchases made by the panelists from the other suppliers;
    determining a relationship between the purchases made by the panelists from the supplier of interest and the purchases made by the panelists from the other suppliers;
    reading customer data regarding purchases made by the customers from the supplier of interest;
    based upon the customer data and the relationship, estimating the purchases made by the customers from the other suppliers;
    aggregating the panelist data and the customer data according to categories;
    performing an unrotated principal components factor analysis on at least one of the aggregated panelist data or the aggregated customer data; and
    generating at least one factor matrix for scoring at least one of the panelist data or the customer data based on said aggregating and said performing the unrotated principal components factor analysis.

2. The method of claim 1 wherein the aggregated data includes a number of dollars that each panelist spent with the supplier of interest by category and a number of dollars that each panelist spent with the other suppliers by category.

3. The method of claim 2 wherein the aggregated data includes share for the supplier of interest and share for the other suppliers by category.

4. The method of claim 1 further comprising determining predictor variables based upon at least one of the aggregated panelist data and the aggregated customer data.

5. The method of claim 4 wherein the predictor variables include the following:
    factors $F_1$ through $F_i$ resulting from the unrotated principal components factor analysis;
    a total number of trips in which dollars were spent in a category; and
    a total number of dollars spent in a category.

6. The method of claim 5 wherein the predictor variables also include the following:
    the squares of the factors $F_1$ through $F_i$;
    interdependent factors based upon products of the factors $F_1$ through $F_i$;
    a square of the total number of trips; and
    a square of the total number of dollars.

7. The method of claim 4 wherein the predictor variables include factors $F_1$ through $F_i$ resulting from the performing step unrotated principal components factor analysis.

8. The method of claim 7 wherein the predictor variables also include the squares of the factors $F_1$ through $F_i$.

9. The method of claim 7 wherein the predictor variables also include interdependent factors based upon products of the factors $F_1$ through $F_i$.

10. The method of claim 4 wherein the predictor variables include a total number of trips in which dollars were spent in a category.

11. The method of claim 10 wherein the predictor variables also include a square of the total number of trips.

12. The method of claim 4 wherein the predictor variables include a total number of dollars spent in a category.

13. The method of claim 12 wherein the predictor variables also include a square of the total number of dollars.

14. The method of claim 4 further comprising determining criterion variables based upon at least one of the aggregated panelist data and the aggregated customer data.

15. The method of claim 14 wherein determining criterion variables comprises dividing the panelists into buckets and of determining the criterion variables as the number of panelists in each bucket.

16. The method of claim 14 further comprising executing a routine to generate a set of scoring rules, and creating new predictor variables based upon the scoring rules.

17. The method of claim 16 wherein creating new predictor variables based upon the scoring rules comprises inputting the panelist data and the customer data to the scoring rules by product category and by bucket of panelist IDs and summing an output of the scoring rules by product category and by bucket.

18. The method of claim 16 further comprising performing a linear regression based upon the new predictor variables and the criterion variables to generate the relationship, wherein the relationship is a linear relationship.

19. The method of claim 18 wherein estimating the purchases made by the customers from the other suppliers comprises applying the customer data to the linear relationship.

20. The method of claim 1 further comprising performing an unrotated principal components factor analysis on at least one of the panelist data and the customer data.

21. The method of claim 20 further comprising determining predictor variables based upon at least one of the panelist data and the customer data.

22. The method of claim 21 further comprising determining criterion variables based upon at least one of the panelist data and the customer data.

23. The method of claim 22 further comprising performing a linear regression based upon the predictor variables and the criterion variables to generate the relationship, wherein the relationship is a linear relationship.

24. The method of claim 23 wherein estimating the purchases made by the customers from the other suppliers comprises applying the customer data to the linear relationship to estimate the purchases made by the customers from the other suppliers.

25. The method of claim 1 further comprising performing an unrotated principal components factor analysis on the customer data.

26. The method of claim 25 further comprising performing a linear regression based upon the panelist data to generate the relationship, wherein the relationship is a linear relationship.

27. The method of claim 26 wherein estimating the purchases made by the customers from the other suppliers comprises applying the customer data to the linear relationship.

28. The method of claim 1 wherein the estimating of the purchases made by the customers from the other suppliers comprises estimating by product category the purchases made by the customers from the other suppliers.

29. The method of claim 1, wherein the customer data comprises data associated with a preferred customer identification card.

30. A method of estimating purchases made by customers of a supplier of interest from other suppliers, wherein the method is performed on a computer, and wherein the method comprises:
reading customer data regarding purchases made by the customers from the supplier of interest;
reading panelist data regarding purchases made by panelists from the supplier of interest and purchases made by the panelists from the other suppliers, wherein the panelists are a subset of the customers, and wherein the purchases made by the panelists from the supplier of interest are independent of the purchases made by the panelists from the other suppliers;
based upon the customer data and the panelist data, estimating purchases made by the customers from the other suppliers;
aggregating the customer data and the panelist data according to categories;
performing an unrotated principal components factor analysis on at least a portion of the aggregated data; and
generating at least one factor matrix for scoring at least one of the panelist data or the customer data based on said aggregating and said performing the unrotated principal components factor analysis.

31. The method of claim 30 wherein estimating purchases made by the customers from the other suppliers comprises determining predictor variables based upon the unrotated principal components factor analysis and upon at least a portion of the aggregated data.

32. The method of claim 31 wherein estimating purchases made by the customers from the other suppliers comprises performing a linear regression on the predictor variables to generate a linear equation for each category.

33. The method of claim 32 wherein estimating purchases made by the customers from the other suppliers comprises estimating the purchases made by the customers from the other suppliers in each category by plugging the customer data into the linear equation for each category.

34. The method of claim 30 wherein estimating purchases made by the customers from the other suppliers comprises performing an unrotated principal components factor analysis based upon at least one of the panelist data and the customer data.

35. The method of claim 34 wherein estimating purchases made by the customers from the other suppliers comprises creating a linear equation based upon results from the unrotated principal components factor analysis.

36. The method of claim 35 wherein estimating purchases made by the customers from the other suppliers comprises estimating the purchases made by the customers from the other suppliers by plugging the customer data into the linear equation.

37. The method of claim 30 wherein the estimating of purchases made by the customers from the other suppliers comprises estimating by product category the purchases made by the customers from the other suppliers.

38. The method of claim 30, wherein the customer data comprises data associated with a preferred customer identification card.

39. A system for estimating purchases made by customers of a supplier of interest comprising:
means for analyzing purchases made by the customers from the supplier of interest and purchases made by panelists from both the supplier of interest and other suppliers, wherein the panelists are a subset of the customers of the supplier of interest, and wherein the purchases made by the panelists from the supplier of interest are independent of the purchases made by the panelists from the other suppliers, the analyzing means to perform an unrotated principal components factor analysis based upon purchase data associated with at least one of purchases made by the panelists or purchases made by the customers, the analyzing means generating at least one factor matrix for scoring the purchase data based on said unrotated principal components factor analysis; and
means for estimating purchases by the customers from the other suppliers based upon the analyzed purchases.

40. The system of claim 39 wherein the means for analyzing comprises means for determining a linear relationship based upon results from the unrotated principal components factor analysis.

41. The system of claim 40 wherein the linear relationship relates purchases made by the panelists from the supplier of interest to purchases made by the panelists from the other suppliers.

42. The system of claim 40 wherein the means for estimating is to estimate the purchases by the customers from the other suppliers based upon the purchases by the customers from the supplier of interest and upon the linear relationship.

43. The system of claim 39 wherein the means for analyzing comprises means for determining a linear relationship between purchases made by the panelists from the supplier of interest and purchases made by the panelists from the other suppliers.

44. The system of claim 43 wherein the means for estimating is to estimate the purchases by the customers from the other suppliers by inserting the purchases by the customers from the supplier of interest into the linear relationship.

45. The system of claim 39 wherein the means for estimating purchases by the customers from the other suppliers based upon the analyzed purchases comprises means for estimating by product category the purchases by the customers from the other suppliers based upon the analyzed purchases.

46. The system of claim 39, wherein the customer purchase data comprises data associated with a preferred customer identification card.

* * * * *